United States Patent [19]

Mohat

[11] 4,356,403
[45] Oct. 26, 1982

[54] MASTERLESS POWER SUPPLY ARRANGEMENT

[75] Inventor: William D. Mohat, Euclid, Ohio

[73] Assignee: The Babcock & Wilcox Company, New Orleans, La.

[21] Appl. No.: 236,402

[22] Filed: Feb. 20, 1981

[51] Int. Cl.³ .............................................. H02J 1/04
[52] U.S. Cl. .................................................... 307/60
[58] Field of Search ........................ 307/32, 53, 55, 60

[56] References Cited

U.S. PATENT DOCUMENTS 3,704,381 11/1972 Nercessian ............................ 307/53

Primary Examiner—Michael L. Gellner
Attorney, Agent, or Firm—James A. Hudak; Vytas R. Matas; Robert J. Edwards

[57] ABSTRACT

A power supply arrangement is disclosed wherein the power supplies (12, 14) share the power requirements of a common load (20) approximately equally and wherein either of the power supplies (12, 14) can act as the "master" while the other power supply acts as the "slave". The arrangement utilizes an integrating differential error amplifier (54), an inverting amplifier (56), and a non-inverting amplifier (58) which are electrically connected between the common load (20) and the power supplies (12, 14) to detect any difference in the output current of the power supplies (12, 14) due to a difference in output voltage, and correct same by increasing the output voltage of the power supply having the lower output voltage until the difference is eliminated. In this manner, either power supply (12, 14) can act as the "master" while the other power supply acts as the "slave".

8 Claims, 1 Drawing Figure

MASTERLESS POWER SUPPLY ARRANGEMENT

TECHNICAL FIELD

The present invention relates generally to power supply arrangements, and more particularly to a power supply arrangement which, through redundancy, provides continuity of power to a common load and load sharing between the supplies.

BACKGROUND ART

Critical electronic installations typically require redundant power supply arrangements in order to insure continuation of power in the event of a single power supply failure. Conventional redundant power supply arrangements, while adequate for some power supply arrangements, typically cannot be used effectively with large, multiple output switching-mode power supplies for a variety of reasons. For example, the conventional "OR" circuit arrangement, with remote sensing, for power supplies requires that both power supplies be maintained at exactly the same output voltage level. If one of the power supplies senses a load voltage higher than its own preset voltage level, it automatically responds by reducing its output voltage. This condition eventually results in the output voltage of this power supply collapsing. In contrast, if the conventional "OR" circuit arrangement utilizes local sensing, the aforementioned condition does not result in the collapse of the output voltage of the power supply because each power supply maintains its output voltage behind its isolation diode. However, with this circuit arrangement, load current changes cause line and diode voltage drops that cannot be compensated for by the power supplies, i.e., this circuit arrangement has poor load regulation. If a master-slave power supply arrangement with load sharing is utilized, some of the aforementioned problems are overcome, however, this arrangement has an inherent problem, i.e., if a "slave" power supply fails, the "master" power supply can take over, but if the "master" should fail, the "slave" is forced to also fail. This disadvantage is the result of this power supply arrangement not being totally redundant.

Because of the foregoing, it has now become desirable to develop a power supply arrangement that utilizes load sharing between the supplies and is totally redundant so that if either power supply fails, the other power supply will automatically furnish the total power required by the load.

SUMMARY OF THE INVENTION

The present invention solves the aforementioned problems associated with the prior art as well as other problems by providing a power supply arrangement that utilizes load sharing and is totally redundant. More specifically, the present invention provides a power supply arrangement that utilizes an error amplifier and two specially designed drive amplifiers arranged in such a way so as to make the arrangement "masterless", i.e., if either power supply should fail, the other power supply automatically furnishes the total power requirements of the load. The error amplifier detects any difference in the output voltage of the power supplies and, when a difference occurs, causes the power supply having the lower output voltage to increase its output voltage a commensurate amount until the difference is eliminated. In effect, either power supply can be the "master" supply while the other supply acts as the "slave". Whichever power supply has the higher output voltage at any given time becomes the "master", while the other supply becomes the "slave". Because of this, any output voltage drift is automatically compensated for, and if the "master" fails, the "slave", which now has the higher output voltage, immediately becomes the new master.

In view of the foregoing, it will be seen that one aspect of the present invention is to provide a power supply arrangement wherein either of the power supplies can act as the "master" power supply, while the other supply acts as the "slave".

Another aspect of the present invention is to provide a power supply arrangement wherein the failure of either of the supplies causes the remaining supply to automatically furnish the total power required by the load.

Still another aspect of the present invention is to provide a power supply arrangement wherein the power supplies share the load requirements equally.

Yet another aspect of the present invention is to provide a power supply arrangement which is totally redundant to insure the availability of power to the load.

These and other aspects of the present invention will become more clearly understood after a review of the following description of the preferred embodiment when considered with the following drawing.

DESCRIPTION OF THE PREFERRED EMBODIMENT

Figure 1:
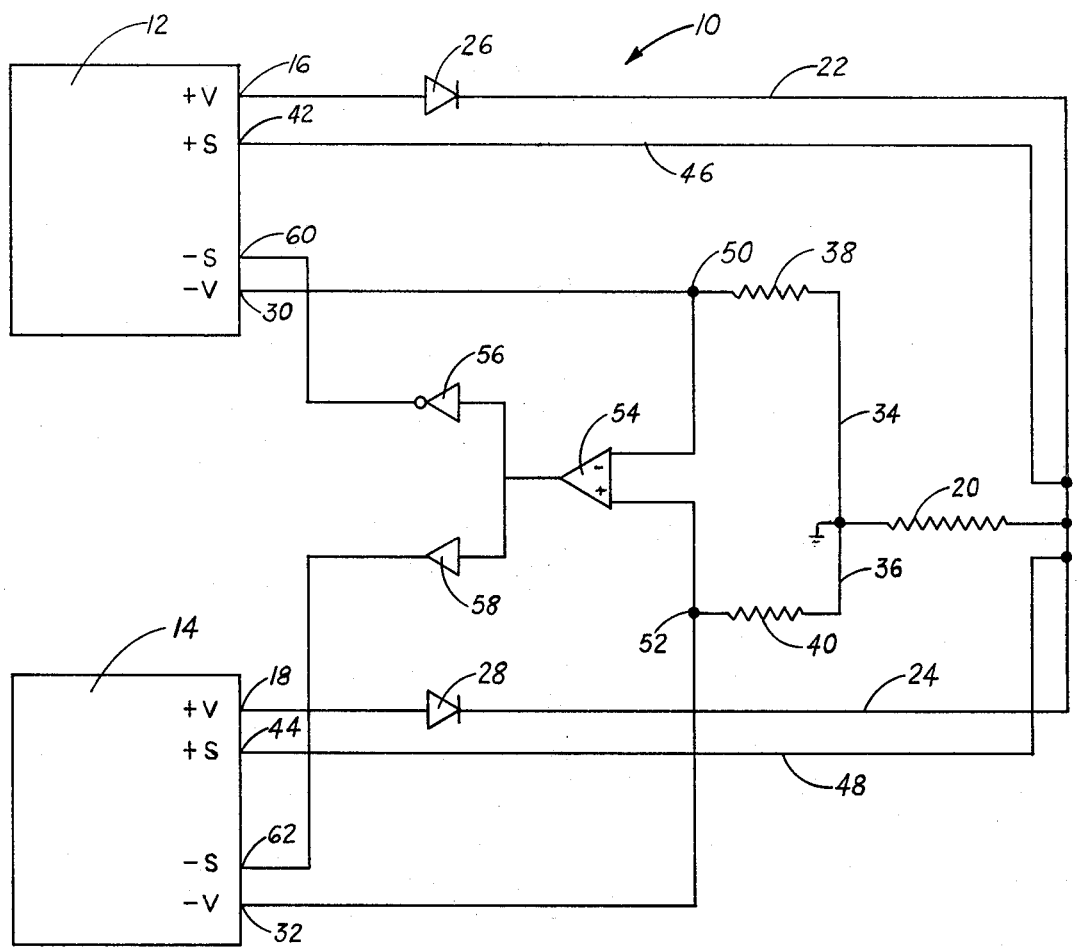
FIG. 1 is an electrical schematic of the invention of this disclosure.

Referring now to the drawing where the illustration is for the purpose of describing the preferred embodiment of the invention and is not intended to limit the invention hereto, FIG. 1 illustrates the electrical circuit 10 used by the apparatus of the present invention. The circuit 10 is comprised of two similar power supplies 12, 14 whose respective positive voltage terminals 16, 18 are connected to a common load 20 via voltage busses 22, 24 and isolation diodes 26, 28. The common load 20 is, in turn, connected to the negative voltage terminals 30, 32 of the respective power supplies 12, 14 via return busses 34, 36. The total resistance of bus 34 is shown as resistance 38, whereas the total resistance of bus 36 is shown as resistance 40. In this circuit arrangement, each of the power supplies 12, 14 can supply full load power to the common load 20 and can provide uninterrupted service thereto even if one of the power supplies becomes totally inoperative. The power supplies 12, 14 are of the "Switching Mode" type and are of similar construction and size. As such, they should be purchased or designed for a particular application. Inasmuch as the invention of this disclosure is directed to the control and regulation of these power supplies, and not to the construction of same, no further description of these supplies will be made other than they should be equipped with both positive and negative "sense" (S) feedback or control terminals.

The positive "sense" (S) terminals 42, 44 of the respective power supplies 12, 14 are connected to the input of the common load 20 via connecting leads 46, 48, respectively. The output of the common load 20 is, in turn, connected via return busses 34, 36 and at points 50, 52 to the inputs to an integrating differential amplifier 54. The output of the integrating differential amplifier 54 is, in turn, connected to the inputs to amplifiers 56, 58 whose outputs are connected to the negative sense (S) terminals 60, 62 of the power supplies 12, 14, respectively.

The integrating differential amplifier 54 is of standard construction and has a gain of one. This amplifier is connected such that if point 50 is more negative than point 52, the output of amplifier 54 is positive, but if point 50 is more positive than point 52, the output of amplifier 54 is negative. Amplifier 56 is an inverting amplifier, i.e., when its input is negative, its output is positive. In contrast amplifier 58 is a non-inverting amplifier, i.e., when its input is positive, its output is also positive. Both amplifiers 56 and 58 have a gain of one. In addition, each of these amplifiers 56, 58 has a unique operating feature in that their outputs can never be negative and their outputs are limited to a specific percentage (generally 5%) of the rated output voltage of the power supplies 12, 14. By so limiting the outputs of these amplifiers 56, 58, the power supplies 12, 14 are protected from being driven to a level which could produce damage thereto in the event of a broken lead or malfunctioning component.

Since only a negligible current flows through the connecting leads 46, 48 to the load 20, there is only a negligible voltage drop across these leads. Thus, the voltage applied to the positive sense (S) terminals is the same as the voltage at load 20. This is not the case for the voltage busses 22, 24 and the return busses 34, 36. The current flow through these busses is typically much greater than the current flow through the sense leads 46, 48. In addition, the resistance of the respective busses will not be exactly the same nor will be the resistance of the isolation diodes 26, 28. Thus, the two parallel load circuits, which are apparently identical, typically do not equally share the load. In addition, the normal tendency of the output voltage of power supplies to "drift" slightly from their set point also causes an unequal sharing of the common load 20 by the power supplies 12, 14 unless some type of correction is made in their output voltages.

In operation, the output voltages of the power supplies 12 and 14 are adjusted as closely as possible to the voltage required to power the common load 20. Even though these power supplies 12, 14 are so adjusted, in all probability the output voltage of one power supply will be slightly higher than that of the other power supply. Assuming this is the case and that the output voltage of power supply 12 is slightly higher than that of power supply 14, then the current flow through voltage bus 34 to the common load 20 will be slightly greater than the current flow through voltage bus 36 to the load 20. This causes point 50 to become more negative than point 52 because of the greater voltage drop across bus resistance 38 than across bus resistance 40. Under these conditions, the output of the integrating differential amplifier 54 becomes positive. In addition, inasmuch as the integrating differential amplifier 54 has a gain of one, the percentage gain of this amplifier will become the same as the difference in voltage between points 50 and 52 expressed as a percentage of the desired output voltage of the power supplies 12, 14. Thus, if the difference in voltage between points 50 and 52, expressed as a percentage of the desired supply voltage, is 1%, then the output of the differential amplifier 54 will also become 1%.

The inverting amplifier 56 senses the positive voltage output of the integrating differential amplifier 54 and attempts to produce a negative output, but as previously stated, cannot produce a negative voltage and, instead applies a "zero" voltage to the negative sense (S) terminal 60 of power supply 12, which has no effect on the output voltage of power supply 12. The non-inverting amplifier 58, however, senses the positive voltage output of the differential amplifier 54 and increases its output voltage by a like amount which is applied to the negative sense (S) terminal 62 of power supply 14 which, in turn, increases its output voltage a commensurate amount until a state of equilibrium is attained under which, for all practical purposes, the common load 20 is shared equally by the power supplies 12, 14.

Alternatively, if the output voltage of power supply 14 is slightly higher than that of power supply 12, point 52 will become more negative than point 50 and the integrating differential amplifier 54 will produce a negative output. Here again, the percentage gain of the differential amplifier 54 will become the same as the difference in voltage between points 50 and 52 expressed as a percentage of the desired output voltage of the power supplies 12, 14. The non-inverting amplifier 58 senses the negative output voltage of the integrating differential amplifier 54 and attempts to produce a negative output but it cannot do so. Instead, non-inverting amplifier 58 applies a "zero" voltage to the negative sense (S) terminal 62 of power supply 14, which has no effect on the output voltage of power supply 14. The inverting amplifier 56, sensing the negative output voltage of the differential amplifier 54, inverts the output voltage and produces a like positive voltage which is applied to the negative sense (S) terminal 60 of the power supply 12 which, in turn, increases its output voltage a commensurate amount until a state of equilibrium is again achieved under which the common load 20 is shared equally by the power supplies 12, 14.

From the foregoing it is apparent that what has been achieved is the equal sharing by two power supplies of the requirements of a common load. This has two beneficial effects, the first being that neither power supply is normally operating near its capacity, i.e., in a current limit condition, thus increasing the operating life of both power supplies and increasing the MTBF (mean time before failure rate). The second beneficial effect is that if either power supply fails, the other supply assumes the full load current since a truly redundant system of paralleling two power supplies has been achieved. Furthermore, when the two power supplies are equally sharing the load and one of the supplies fails, the other supply is only confronted with a 50% change, rather than a 100% change as in the prior art devices, in its output load requirements, thus minimizing any tendency to "overshoot" the required output voltage.

Certain modifications and improvements will occur to those skilled in the art upon reading the foregoing. It should be understood that all such modifications and improvements have been deleted herein for the sake of conciseness and readability but are properly within the scope of the following claims.

I claim:

1. A power supply apparatus for supplying electrical power to a common load comprising a first power supply means electrically connected to said common load, a second power supply means electrically connected to said common load, means for detecting the existence of a difference in the output current (due to a difference in the output voltages) of said first and second power supply means, said detecting means being electrically connected to said common load and producing a signal proportional to said difference in said output voltage of said first and second power supplies, and means responsive to said signal produced by said detecting means causing the output voltage of one of said first and second power supply means to change so as to be approximately equal to the output voltage of the other of said first and second power supply means.

2. The power supply apparatus as defined in claim 1 wherein said signal responsive means causes the output voltage of said power supply means having the lower output voltage to increase so as to be approximately equal to the output voltage of said power supply means having the higher output voltage.

3. The power supply apparatus as defined in claim 1 wherein said signal responsive means is comprised of an inverting device and a non-inverting device, said inverting and non-inverting devices being electrically connected to said detecting means and being separately actuatable depending upon said signal produced by said detecting means.

4. The power supply apparatus as defined in claim 3 wherein said inverting and non-inverting devices are designed so that simultaneous operation thereof is prevented.

5. The power supply apparatus as defined in claim 1 wherein said first and second power supply means approximately equally supply electrical power to said common load.

6. The power supply apparatus as defined in claim 1 wherein said detecting means is an integrating differential amplifying device.

7. A power supply apparatus for supplying electrical power to a common load comprising a first power supply means electrically connected to said common load, a second power supply means electrically connected to said common load, said first and second power supply means approximately equally supplying electrical power to said common load, means for detecting the existence of a difference in the output current (due to a difference in output voltage) of said first and second power supply means, said detecting means being electrically connected to said common load and producing a signal proportional to said difference in said output voltage of said first and second power supply means, and means responsive to said signal produced by said detecting means causing the output voltage of said power supply means having the lower output voltage to increase so as to be approximately equal to the output voltage of said power supply means having the higher output voltage.

8. A power supply apparatus for supplying electrical power to a common load comprising a first power supply means electrically connected to said common load, a second power supply means electrically connected to said common load, said first and second power supply means approximately equally supplying electrical power to said common load, means for detecting the existence of a difference in the output current (due to a difference in output voltage) of said first and second power supply means, said detecting means being electrically connected to said common load and producing a signal proportional to said difference in said output voltage of said first and second power supply means, and means responsive to said signal produced by said detecting means, said signal responsive means comprising an inverting device and a non-inverting device electrically connected to said detecting means and being separately actuatable causing the output voltage of said power supply means having the lower output voltage to increase so as to be approximately equal to the output voltage of said power supply means having the higher output voltage.

* * * * *